UNITED STATES PATENT OFFICE.

FRANK L. SMITH, OF SIOUX CITY, IOWA.

SIRUP FOR SODA-WATER.

SPECIFICATION forming part of Letters Patent No. 406,783, dated July 9, 1889.

Application filed April 8, 1889. Serial No. 306,429. (No specimens.)

*To all whom it may concern:*

Be it known that I, FRANK L. SMITH, of Sioux City, in the county of Woodbury and State of Iowa, have invented certain new and useful Improvements in Sirups; and I do hereby declare the following to be a full, clear, and exact description of the invention, such as will enable others skilled in the art to which it pertains to make and use it.

My invention relates to an improvement in sirups to be used in connection with soda-water fountains; and it consists in a mixture of celery, alcohol, phosphoric acid, water, and sugar, as will be more fully described hereinafter.

In the manufacture of this sirup I take of well-bleached celery, sixteen ounces; alcohol, sixteen ounces; dilute phosphoric acid, two ounces; sugar, eight pounds; water sufficient to make eight pints of the sirup.

The celery is first mashed into a pulp and then put to macerate in a closed vessel for forty-eight hours with a mixture of alcohol, phosphoric acid, and water. At the end of this time the mixture is strained to get out the celery pulp. The sugar is then added to the liquid, dissolved, and the mixture is ready to bottle.

Having thus described my invention, I claim—

A sirup composed of celery, alcohol, phosphoric acid, water, and sugar, in or about the proportions described.

In testimony whereof I affix my signature in presence of two witnesses.

FRANK L. SMITH.

Witnesses:
C. C. SEDGWICK,
O. A. TORWICK.